Figure 1:
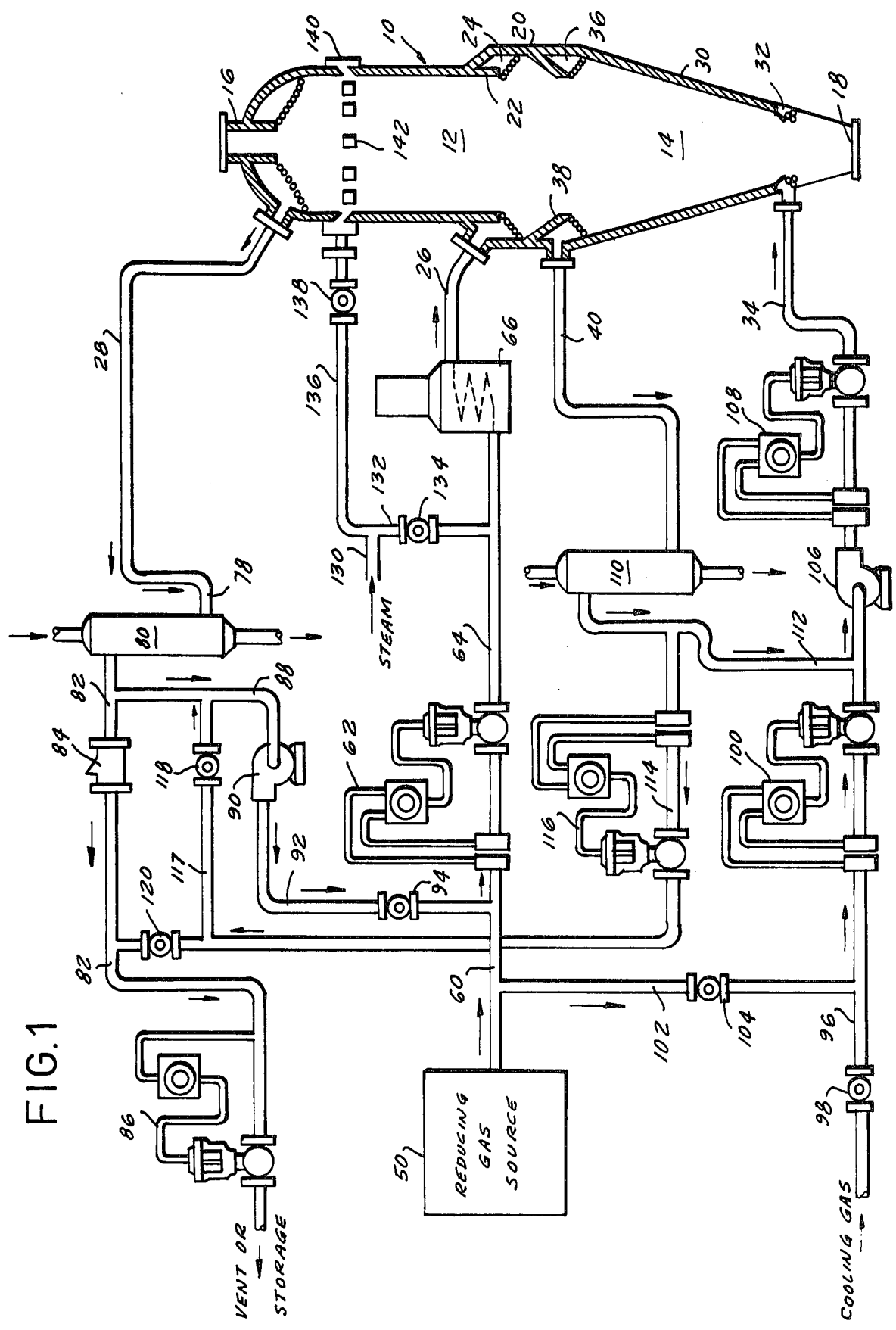

United States Patent [19]

Price-Falcon et al.

[11] 4,150,972
[45] Apr. 24, 1979

[54] CONTROLLING CARBURIZATION IN THE REDUCTION OF IRON ORE TO SPONGE IRON

[75] Inventors: Juan F. Price-Falcon; Patrick W. MacKay, both of Garza Garcia; Enrique R. Martinez-Vera; Gilberto Guerra-Garcia, both of Monterrey, all of Mexico

[73] Assignee: Fierro Esponja, S.A., Mexico

[21] Appl. No.: 852,535

[22] Filed: Nov. 17, 1977

[51] Int. Cl.² ............................................ C21B 13/02
[52] U.S. Cl. ...................................................... 75/35
[58] Field of Search ............................... 75/34, 35, 26

[56] References Cited
U.S. PATENT DOCUMENTS 3,844,766  10/1974  Beggs .................................... 75/35

FOREIGN PATENT DOCUMENTS 501424  5/1939  United Kingdom ........................ 75/35

Primary Examiner—M. J. Andrews
Attorney, Agent, or Firm—Curtis, Morris & Safford

[57] ABSTRACT

A method for inhibiting carburization of metal-bearing material in the reduction zone of a vertical shaft, moving bed reactor for the direct gaseous reduction of iron ore to sponge iron. Carburization within the reduction zone is decreased by regulating the water vapor content of the reducing gas in any of various ways, e.g., by adding water vapor in the form of steam to the reducing gas either before it enters the reduction zone, while it is within the reduction zone, or after it leaves the reduction zone or by recirculating a portion of the effluent gas from the reactor and cooling the recirculated gas to a predetermined extent.

7 Claims, 2 Drawing Figures

CONTROLLING CARBURIZATION IN THE REDUCTION OF IRON ORE TO SPONGE IRON

This invention relates to the gaseous reduction of particulate metal ores to metals in particulate form in a moving bed, vertical shaft reactor, and more particularly, to a method of producing by direct gaseous reduction sponge metal having a predetermined desired degree of carburization. In the following description the method is illustratively described as applied to the reduction of iron ore to sponge iron. However, as the description proceeds, it will be evident to those skilled in the art that the invention is also applicable to the treatment of ores other than iron ore.

Broadly speaking, the production of sponge iron in a vertical shaft, moving bed reactor ordinarily involves two principal steps, namely, reduction of the ore in a reduction zone with a suitable hot reducing gas, typically a gas largely composed of carbon monoxide and hydrogen, at temperatures of the order of 700° to 1000° C., preferably 750° to 950° C., and cooling the resulting sponge iron with a gaseous coolant to a temperature of the order of say 100° to 200° C., preferably below 100° C. A process of this type is disclosed in Celada et al. U.S. Pat. No. 3,765,872 wherein a vertical reactor is used having a reduction zone in the upper portion thereof and a cooling zone in the lower portion thereof. The ore to be treated flows down through the reduction zone wherein it is reduced with a stream of hot reducing gas, after which the reduced ore flows through a cooling zone wherein it comes into contact with a stream of cooling gas. The cooled sponge iron is removed at the bottom of the reactor. Commonly both the reducing gas and cooling gas are recirculated in closed loops to which streams of fresh gas are added and from which streams of spent gas are removed.

Sponge iron produced by a process of the type disclosed in U.S. Pat. No. 3,765,872 is commonly used as a source of iron units for the manufacture of steel in an electric arc furnace. Such sponge iron normally contains a certain proportion of iron oxide, e.g., 10% to 20% by weight, since it is uneconomic to attempt to achieve 100% metallization of the ore in the gaseous reduction reactor. As the degree of reduction of the iron-bearing material approaches 100% metallization, it becomes increasingly difficult and time-consuming and requires an excessive amount of reducing gas to remove the remaining oxygen from the material. While the reduction reaction rate can be increased to some extent by increasing the temperature, such a temperature increase is limited by the fact that the operating temperature must be kept below the sintering temperature if the sponge iron is to remain readily removable from the reactor.

This temperature limitation does not apply to the electric furnace wherein the iron-bearing material is handled in molten form. Thus it is theoretically possible to charge the electric furnace with sponge iron of say 85% metallization and add a sufficient amount of elemental carbon to the furnace charge to react with the oxygen remaining in the iron ore. However, it is difficult to effect an intimate contact between elemental carbon and the sponge iron particles in the electric furnace, especially since the carbon has a much lower density than the iron and tends to become segregated therefrom. Accordingly carburization of the sponge iron is desirably effected before the sponge iron is fed to the steel furnace, e.g., in the reduction reactor.

Such carburization of sponge iron with a carbon-containing gas in a reduction reactor is disclosed, for example, in U.S. Pat. Nos. 3,136,624; 3,748,120; 3,765,872; and Canadian Pat. No. 508,951. It is generally known that in the operation of a moving bed reactor carbon deposition upon the metal-bearing particles occurs in both the reduction zone and cooling zone and that under suitable conditions most, if not all, of the deposited carbon can be made to react to form iron carbide.

When sponge iron containing iron carbide is used as a feed material to an electric arc steel-making furnace, a number of important advantages are achieved. In the first place, such sponge iron has a reduced melting point that facilitates melting thereof in the steel-making process. Also the carbon in the form of iron carbide is considerably more reactive than bulk carbon and is a more effective reducing agent for the residual oxygen of the sponge iron in the electric furnace. A still further advantage of using sponge iron containing iron carbide is that the reaction of iron carbide with residual ferrous oxide in the sponge iron consumes less heat than the reaction between elemental carbon and ferrous oxide.

Other advantages of using sponge iron containing iron carbide as a charge to the electric furnace arise out of the fact that the reduction of residual ferrous oxide by the iron carbide produces carbon monoxide that bubbles up through the melt and produces a desirable agitation thereof. The gas produced also generates a light, foamy slag that blankets the electrodes and thus reduces radiation losses to the roof and walls of the furnace. The foamy slag provides a further advantage in cases where a continuous feed of sponge iron to the furnace is used in that the sponge iron pellets are preheated as they drop through the slag and start reacting before they reach the molten bath.

It should be noted that the foregoing advantages can be attained without increasing the thermal load on the electric furnace. The principal reactions involved in the reduction of residual iron oxide with iron carbide may be represented as follows:

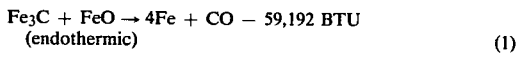

$$Fe_3C + FeO \rightarrow 4Fe + CO - 59{,}192 \text{ BTU} \quad \text{(endothermic)} \qquad (1)$$

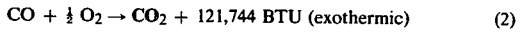

$$CO + \tfrac{1}{2} O_2 \rightarrow CO_2 + 121{,}744 \text{ BTU (exothermic)} \qquad (2)$$

It is evident from the foregoing equations that while the reduction reaction is endothermic, it produces carbon monoxide which is oxidized to carbon dioxide by a strongly exothermic reaction. Thus the reduction of the ferrous oxide in the sponge iron by the carbon therein does not produce any increase in the heat requirements of the electric furnace. In general it has been found that overall economies and advantages are achieved by so operating the gaseous reduction plant as to produce sponge iron having less than the maximum attainable metallization and carburizing the sponge iron in the reduction plant to an extent sufficient to permit completion of the reduction in the electric furnace, thereby effectively utilizing the high temperature reduction capability of the furnace.

In dealing with the distribution of the reducing function between the reduction plant and the electric furnace, it has been found convenient to utilize a parameter which may be characterized as the "potential" or "equivalent" metallization. It has been found that in general each percent of carbon present in the sponge iron as ferric carbide or elemental carbon is capable of reducing approximately 6% of FeO in the electric furnace. Hence a sponge iron of 85% metallization containing 2% of reactive carbon can be said to have a potential metallization of 97% in the sense that if the carbon of the sponge iron reacts fully with the residual FeO present therein, a 97% metallization will have been achieved.

It should be noted that while a certain amount of carburization of the sponge iron provides important advantages as outlined above, excessive carburization is disadvantageous in a number of respects. For example, excessive carburization de-stabilizes the electric arc of the steel furnace, thereby increasing the wear rate of the refractory lining of the furnace. Also the refining period must be extended in order to get rid of excess carbon. In many cases the desirable carbon content of the sponge iron falls within the range 1% to 3% by weight. It will be evident that the practicality of producing a sponge iron having a predetermined desired relationship between metallization and potential metallization to achieve the advantages outlined above depends importantly on the controllability of the carburization step in the reduction process. For any given desired potential metallization the carbon content of the sponge iron should desirably be maintained within close limits.

As pointed out above, it is known that carburization of the sponge iron can be effected in the reduction zone of a moving bed reactor. For example, carburization of metallized pellets in the reduction zone of a moving bed reactor is disclosed in U.S. Pat. No. 3,748,120. However, carburization in the reduction zone cannot readily be controlled to the desired degree of precision because of the fact that the dominant requirement in the reducing zone is that operating conditions be so adjusted as to produce optimum desired reduction, and the optimum reducing conditions are usually not the optimum carburization conditions. To some extent the same dilemma applies to the cooling zone if both cooling and carburizing are to be carried out therein. However, as indicated in U.S. Pat. No. 3,765,872, there are a number of ways of resolving this dilemma in respect to the operation of the cooling zone.

One problem that has been encountered in attempting to achieve a precise control of carburization in a reduction system of the type disclosed in U.S. Pat. No. 3,765,872 arises out of the fact that the degree of carburization occurring in the reduction zone may be so great that the sponge iron entering the cooling zone may already contain more than the desired amount of carbon. It is evident that under such circumstances the degree of carburization of the product sponge iron cannot be regulated by controlling the extent of carburization in the cooling zone.

It is accordingly an object of the present invention to provide an improved method of controlling the carburization of sponge iron in a moving bed ore reduction reactor. It is another object of the invention to provide a method of inhibiting the deposition of carbon in the reduction zone of such a reactor to permit effective control of the carburization in the cooling zone of the reactor. Other objects of the invention will be in part obvious and in part pointed out hereafter.

As conductive to a clearer understanding of the invention, it may be pointed out that reduction of FeO in the reduction zone of the reactor is effected by a hot reducing gas composed largely of carbon monoxide and hydrogen in accordance with the following equations:

$$CO + FeO \rightarrow Fe + CO_2 \qquad (3)$$

$$H_2 + FeO \rightarrow Fe + H_2O \qquad (4)$$

The carburization reactions that occur concurrently with the reduction reactions may be represented by the equations:

$$2CO \rightarrow C + CO_2 \qquad (5)$$

$$3C + Fe \rightarrow FeC_3 \qquad (6)$$

It is known that the carburizing reactions are favored by temperatures of the order of 500° to 700° C. and thus carburization tends to occur near the center of the reduction zone. From equation (5) it is evident that the rate of carburization in the reduction zone is importantly influenced not only by the temperature but also by the concentration of carbon monoxide in the reducing gas.

It has now been found quite unexpectedly that although carbon monoxide is consumed in accordance with equation (3), the reduction zone is often a net generator of carbon monoxide. While we do not wish to be bound by any particular theory as why this is so, it is our present understanding that this suprising result comes about because of the conversion of carbon dioxide to carbon monoxide in the lower portion of the reducing zone in accordance with the following equation:

$$CO_2 + H_2 \rightarrow CO + H_2O \qquad (7)$$

This reaction appears to be favored in the lower portion of the reduction zone both because of the relatively high temperature at that point and also because the sponge iron therein catalyzes the reaction. It will be apparent from a consideration of equations (5) and (7) that the reaction of equation (7), if it occurs, would promote deposition of carbon in accordance with equation (5) both by decreasing the concentration of carbon dioxide in the gas and increasing the concentration of carbon monoxide therein.

In accordance with the present invention the formation of elemental carbon and ferric carbide in the reducing zone is indirectly decreased by reducing the carbon monoxide content of the gas in the reduction zone. More particularly, the water vapor content of the gas is so adjusted as to drive the reaction represented by equation (7) above to the left, that is, to promote the well known water gas shift reaction:

$$CO + H_2O \rightarrow CO_2 + H_2 \qquad (8)$$

The adjustment of the water vapor content of the reducing gas can be effected by adding water, preferably in the form of steam, to the reducing gas or alternatively, if the recirculated reducing gas contains more than the desired amount of water vapor, the water vapor content can be adjusted to the desired value by cooling the recirculated gas to a predetermined extent. It has been found that by proper adjustment of the water vapor content of the reducing gas the amount of carbon formation in the reducing zone can be substantially decreased, because the carbon monoxide present in the gas stream presumably reacts preferentially according to equation (8) to produce carbon dioxide rater than according to equation (5) to produce elemental carbon. More particularly, the carbon content of the sponge iron can be decreased in this way to a value below the minimum required in the product sponge iron and thereby permit effective regulation and control of the carbon content of the sponge iron in the cooling zone without seriously interfering with the optimization of reducing conditions in the reducing zone.

The external portion of the reducing loop commonly comprises a gas cooler, a circulating pump and a heater for re-heating the reducing gas through which the effluent gas from the reactor passes in series. Water vapor may be added to the circulating gas, for example, just before the gas enters the heater or introduced directly into the reactor near the top of the reduction zone or fed to a separate catalytic reactor wherein the water gas shift reaction takes place and through which the spent reducing gas flows before reaching the cooler. Also the water vapor or steam can be introduced into the make-up reducing gas stream fed to the reducing gas loop and separate portions of the water vapor may be introduced at two or more of these points in the system. In addition, if the water vapor content of the effluent reducing gas is relatively high, it can be decreased to the desired value by adjusting the flow of cooling water to the gas cooler.

In most cases the preferred mode of operation involves the introduction of steam directly into the reactor near the top of the ore bed in the reduction zone of the reactor. The addition of steam to the reducing gas necessarily dilutes the reducing constituents thereof. If steam is added to the feed gas to the reduction zone, the ratio $H_2:(H_2 + H_2O)$ is substantially reduced and consequently the reduction potential of the gas is decreased at the bottom of the reduction zone, i.e., at the point in the system at which the last and most difficult part of the reduction takes place and a high quality gas is especially important.

If, on the other hand, the steam is added near the top of the reduction zone where the initial and relatively easy reduction of the ore occurs, the dilution of the reducing gas by the steam will have relatively little effect on the overall reduction efficiency. Also the desired water gas shift reaction (equation 8 above), which occurs upon addition of steam to the reducing gas, is exothermic and hence contributes to the heating of the entering fresh ore. Still further the iron oxide present at the top of the bed is a good catalyst for the water gas shift reaction and thus promotes this desired reaction.

The modification of the present process wherein steam is added to the feed gas to the reduction zone, while subject to the disadvantage noted above, is sometimes advantageous in the special case where the gas fed to the reduction zone contains a substantial amount of methane as, for example, where the make-up gas to the reducing gas loop is a reformed gas enriched with methane or natural gas, or coke oven gas is used as a make-up gas. In such cases the steam can react with methane in accordance with the following equation:

$$CH_4 + H_2O \rightarrow 3H_2 + CO \qquad (9)$$

In this way additional quantities of the reducing constituents hydrogen and carbon monoxide are produced.

As indicated above, the addition of steam to the reducing gas can also be effected in a separate catalytic reactor to which the effluent reducing gas from the reduction zone of the reactor is fed. The use of such a separate reactor is advantageous in that it permits both the catalyst and operation conditions to be independently controlled and optimized, and hence is a somewhat more efficient way of promoting the desired shift reaction. On the other hand, it requires a separate and usually unnecessary piece of equipment.

In some cases it has been found advantageous to adopt a compromise procedure, i.e., to add a minor proportion of the steam to the reducing gas entering the reactor and a major portion of the steam to the upper part of the ore body in the reduction zone of the reactor.

Figure 2:
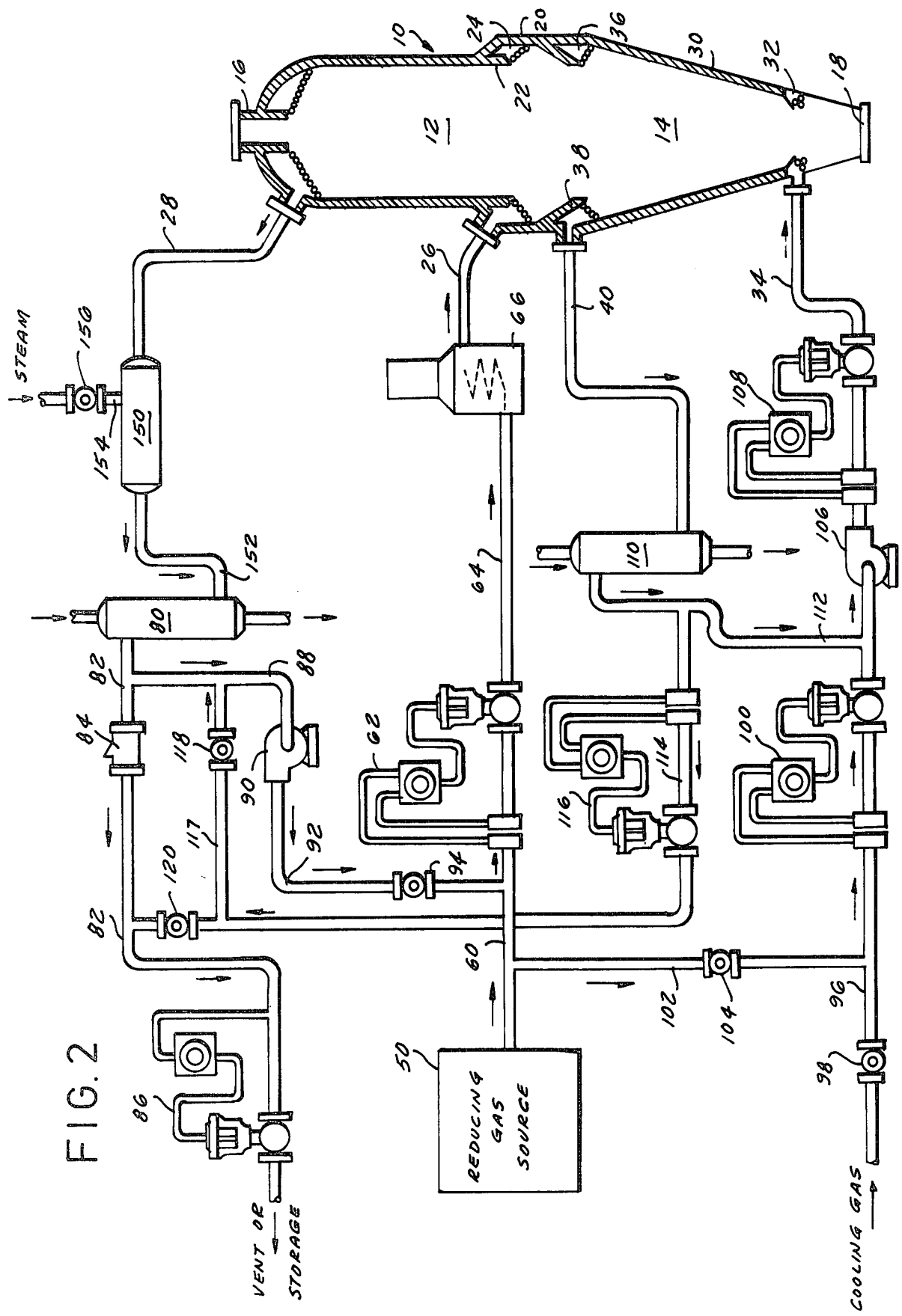

The objects and advantages of the present invention can best be understood and appreciated by reference to the accompanying drawings wherein FIG. 1 illustrates diagrammatically a vertical shaft, moving bed reactor system for carrying out a preferred embodiment of the method of the invention, and FIG. 2 shows a similar system for carrying out a modification of the method of the invention.

Referring to the drawing and particularly to the righthand side of FIG. 1, the numeral 10 generally designates a vertical shaft reactor having a reduction zone 12 in the upper portion thereof and a cooling zone 14 in the lower portion thereof. The reactor 10 is suitably heat-insulated and is interiorally lined with a refractory material in a manner known in the art. Particulate ore to be treated is introduced into the reactor 10 through a charging pipe 16. The ore to be charged may be in the form of either lumps or pre-formed pellets. It flows downwardly through the reduction zone wherein it is largely reduced to sponge iron by upwardly flowing reducing gas, then through the cooling zone 14 wherein it is cooled by upwardly flowing cooling gas and leaves the reactor through the outlet 18. The middle portion of the reactor 10 comprises a bustle 20, the upper end of which cooperates with an annular skirt 22 to form an annular chamber 24 into which the inlet reducing gas flows from a pipe 26 and which serves to distribute the reducing gas around the periphery of the reactor. The reducing gas flows upwardly through the reduction zone 12 and leaves the reactor through a pipe 28.

The lower portion of bustle 20 is tapered to enter a discharge chamber 30 and defines therewith a cooling gas inlet chamber 32 that receives cooling gas from pipe 34 and serves to distribute the cooling gas around the periphery of the reactor. The cooling gas flows upwardly through the cooling zone to an annular cooling gas outlet chamber 36 which is defined by the bustle 20 and a frusto-conical baffle 38. Chamber 36 serves to collect the cooling gas at the top of the cooling zone and deliver it to the cooling gas outlet pipe 40.

Referring now to the left-hand portion of the drawing, reducing gas for reducing the ore is supplied from a suitable reducing gas source 50. Typically the source may be a known catalytic reformer of the type that reforms a mixture of natural gas and steam to produce a mixture of hydrogen and carbon monoxide. Alternatively, coke oven gas, either as produced or reformed, may be used. Also the reducing gas may be produced from gaseous hydrocarbons other than natural gas, or from liquid hydrocarbons or coal.

The reducing gas from source 50 flows through a pipe 60 to the reducing gas loop and more particularly to a flow controller 62 located in a pipe 64 which operates to establish a predetermined flow of reducing gas to the reactor 10. The reducing gas is delivered by pipe 64 to a heater 66 wherein it is heated to a temperature of say 750° to 950° C. and the gas then flows through pipe 26 to the reactor as previously described.

Effluent gas from the reactor flows through the pipe 28 to a quench cooler 80 which operates to condense part of the water from the gas and remove dust therefrom. Gas leaving the cooler 80 may follow either of two paths. Thus it may flow through pipe 82 containing check valve 84 to and through a back pressure regulator 86 and thence vented to the atmosphere, conducted to a suitable point of storage or used as a fuel. Effluent gas from the cooler 80 may also be recirculated from pipe 82 through pipe 88, circulating pump 90, pipe 92 containing valve 94, back to the pipe 64 and thence again into the reduction zone of the reactor. Normally a major portion of the effluent gas from the cooler 80 will be recirculated through pipe 88 and pump 90 of the reducing gas loop and only a minor portion will be withdrawn from the loop through pipe 82 to be used as a fuel, stored or vented.

As indicated above, the reduced ore is cooled by cooling gas in the cooling zone 14 of the reactor. Referring to the lower left-hand portion of the drawing, cooling gas enters the system through a pipe 96 provided with a shut-off valve 98 and a flow controller 100. In theory a wide variety of cooling gases may be used, including hydrogen, carbon monoxide, mixtures thereof, methane or other hydrocarbon gas, carbon dioxide or nitrogen. However, in accordance with the present invention, the sponge iron is carburized in the cooling zone to a desired controllable extent and to achieve this object the cooling gas must contain a controllable amount of carburizing constituents as more fully described below. In some cases it may be desirable for the make-up cooling gas to have the same composition as the make-up reducing gas supplied by the source 50. For this purpose pipe 60 is connected with pipe 96 by a pipe 102 containing the shut-off valve 104.

Upon entering the cooling gas loop the cooling gas flows to a blower 106 the discharge of which is connected to pipe 34 which contains the automatic flow controller 108. Effluent gas leaving the cooling zone through pipe 40 flows to and through a cooler 110 wherein it is cooled and de-watered and thence through a pipe 112 back to the suction of pump 106 to complete the cooling loop. Cooling gas can be withdrawn from the cooling loop through a pipe 114 containing a flow controller 116. In some cases the composition of the cooling gas is such that it can be advantageously transferred to the reducing gas loop and for this purpose pipe 114 is connected by a transfer pipe 117 containing shut-off valve 118 to pipe 88 in such manner that cooling gas withdrawn from the cooling loop can be added to the gas circulating within the reducing gas loop. If it is not desired to transfer the withdrawn cooling gas to the reducing gas loop, the spent cooling gas can flow through valve 120 of pipe 114 to the pipe 82 and thence to vent, storage or use as a fuel as desired.

As pointed out above, in accordance with the present invention the water-gas shift reaction that normally tends to occur in the upper portion of the reduction zone is promoted by introduction of steam into the reducing gas loop. In a preferred embodiment of the invention steam is introduced into the system from a supply pipe 130 and flows through pipe 136 containing valve 138 to a plenum chamber 140 from which the steam is delivered through openings 142 in the upper portion of the body of ore in the reduction zone. Also steam may flow from pipe 130 through pipe 132 containing valve 134 to pipe 64 and thence through heater 66 to the bottom of the reducing zone 12. Still further a portion of the steam may be introduced into the reducing loop through nozzles 142 and a second and preferable minor portion of the steam fed to pipe 64 through pipe 132.

The amount of steam to be used depends upon such factors as the water content of the recirculated gas flowing through pipe 92, the temperature of the gas supplied to the reactor, and the rate of through-put of the ore. In general, the quantity of added steam will fall between 1% and 20% by volume. Typically the steam added to the loop through pipe 132 may amount to say 1 to 5 mol percent of the circulating gas and the steam added through pipe 136 may amount to say 3 to 15 mol percent of the circulating gas.

Turning now to FIG. 2 of the drawings, the system there illustrated is generally similar to that of FIG. 1 and therefore the same reference numerals have been used to identify corresponding parts. In the FIG. 2 system a separate catalytic reactor is introduced into the reducing gas loop. More particularly, the effluent gas from the reducing zone 12 flows through pipe 28 to and through the catalytic reactor 150 and thence through pipe 152 to the cooler 80. Steam is supplied to the reactor 150 through a pipe 154 containing valve 156. As indicated above, this embodiment of the invention is subject to the disadvantage that a separate piece of equipment is required but provides the advantage that the reaction between the steam and reducing gas can be controlled independently of the reactions taking place in the reduction zone of the reactor.

In order to point out more fully the nature of the present invention, data are given in Table I below for a number of illustrative runs, both with and without added steam. In Table I the symbols $F_1$ through $F_5$ represent the flows expressed in standard flow units at each of five points in the system as follows:

$F_1$–Pipe 60
$F_2$–Pipe 64
$F_3$–Pipe 34
$F_4$–Pipe 136
$F_5$–Pipe 132

The flow units of Table I were obtained by assigning to the flow of make-up gas $F_1$ per ton of ore for run No. 1 the arbitrary base value 100 flow units. The other flow unit values given in the Table represent flow per ton of ore adjusted to this base value.

Table I

| Run No. | $F_1$ Flow Units | $F_2$ Flow Units | $F_3$ Flow Units | $F_4$ Flow Units | $F_5$ Flow Units | Temp. ° C. | Met. % | C % |
|---|---|---|---|---|---|---|---|---|
| 1 | 100 | 369 | 135 | 0 | 0 | 750 | 93.9 | 4.7 |
| 2 | 68 | 276 | 113 | 0 | 0 | 850 | 90.4 | 2.9 |
| 3 | 68 | 256 | 113 | 27 | 0 | 850 | 87.6 | 2.3 |
| 4 | 70 | 265 | 117 | 14 | 0 | 850 | 90.2 | 2.1 |
| 5 | 65 | 240 | 109 | 10 | 0 | 850 | 84.9 | 2.2 |
| 6 | 68 | 249 | 99 | 0 | 8 | 850 | 77.9 | 1.7 |

Table I-continued

| Run No. | $F_1$ Flow Units | $F_2$ Flow Units | $F_3$ Flow Units | $F_4$ Flow Units | $F_5$ Flow Units | Temp. °C. | Met. % | C % |
|---|---|---|---|---|---|---|---|---|
| 7 | 67 | 242 | 105 | 0 | 6 | 900 | 92.7 | 2.2 |

From a comparison of runs 1 and 2 on the one hand and runs 3 through 7 on the other hand, it is apparent that the addition of water vapor to the circulating reducing gas substantially reduces the carburization within the reduction zone and thereby permits the effective control of carburization in the cooling zone wherein more precise control can be effected. It is of course to be understood that the foregoing description is intended to be illustrative only and that numerous changes can be made in the proportions and conditions disclosed without departing from the scope of the invention as defined in the appended claims.

We claim:

1. In a process for reducing particulate metal ore to sponge metal in a vertical shaft, moving bed reactor having a reduction zone in the upper portion thereof in which a hot reducing gas largely composed of carbon monoxide and hydrogen is caused to flow through a portion of said bed to reduce the metal ore thereof to sponge metal and a cooling zone in the lower portion of the reactor for cooling the sponge metal, the method of inhibiting the carburization of the sponge metal in said reduction zone which comprises circulating a reducing gas in a loop which comprises said reduction zone and an external conduit interconnecting the top and bottom of said reduction zone and containing a cooler for dewatering the effluent gas from said reduction zone, supplying fresh reducing gas from a source of said gas outside said loop to a point in said loop between said cooler and said reactor, and adding steam to the reducing gas in the upper portion of said reducing zone to reduce the carbon monoxide content of the effluent gas from the reduction zone and thereby decrease the amount of carburization in said reduction zone.

2. A method according to claim 1 wherein one portion of the steam is added to said loop at a point between the fresh gas inlet and the reactor and a second portion of the steam is added to the reactor near the top of said reduction zone.

3. A method according to claim 1 wherein steam is added to the reducing gas to the extent of 3 to 15 mol percent.

4. In a process for reducing particulate metal ore to particles of sponge metal in a vertical shaft, moving bed reactor having a reduction zone in which a hot carbon-containing reducing gas is caused to flow through a portion of said bed to reduce the metal ore thereof to sponge metal, the method of inhibiting carburization of the metal-bearing material in said reduction zone which comprises feeding a stream of hot reducing gas to said reactor near the bottom of said reduction zone to cause said gas to flow upwardly through the bed of metal-bearing material in said zone, withdrawing gas from said reactor near the top of said reducing zone and cooling it to remove water therefrom, re-heating said cooled gas to form said stream of hot gas fed to said reactor and thereby form a closed reducing gas loop including the reduction zone of said reactor, supplying fresh reducing gas from an external source to said loop between the gas cooling and the gas re-heating points of said loop and supplying steam to said reactor at a point near the top of said reduction zone to reduce the carbon monoxide content of the effluent gas and thereby decrease the amount of carburization of the metal-bearing material that occurs in the lower part of the reduction zone.

5. In a process for reducing particulate metal ore to particles of sponge metal in a vertical shaft, moving bed reactor having a reduction zone in which a hot carbon-containing reducing gas is caused to flow through a portion of said bed to reduce the metal ore thereof to sponge metal, the method of inhibiting carburization of the metal-bearing material in said reduction zone which comprises feeding a stream of hot reducing gas to said reactor near the bottom of said reduction zone to cause said gas to flow upwardly through the bed of metal-bearing material in said zone, withdrawing gas from said reactor near the top of said reducing zone and cooling it to remove water therefrom, reheating said cooled gas to form said stream of hot gas fed to said reactor and thereby form a closed reducing gas loop including the reduction zone of said reactor, venting a portion of the cooled gas from said loop, supplying fresh reducing gas from an external source to said loop between the gas venting and the gas re-heating points of said loop and supplying steam to said reactor at a point near the top of said reduction zone to reduce the carbon monoxide content of the effluent gas and thereby decrease the amount of carburization of the metal-bearing material that occurs in the lower part of said reduction zone.

6. A method according to claim 5 wherein steam is added both to the reactor and to the gas recirculating loop with a major portion of the steam being added to the reactor near the top of the reduction zone thereof and a minor portion of the steam being added to the loop at a point between the fresh gas inlet and the reactor.

7. A method according to claim 6 wherein the total steam added to the reducing gas is between 3 and 15 mole percent.

* * * * *